United States Patent [19]
Baird et al.

[11] Patent Number: 5,339,943
[45] Date of Patent: Aug. 23, 1994

[54] BUCKET LIFT DISTRIBUTION SYSTEM

[75] Inventors: Randy K. Baird, Bolivar; Sydney Hilton, Indiana, both of Pa.

[73] Assignee: FMC Corporation, Chicago, Ill.

[21] Appl. No.: 139,656

[22] Filed: Oct. 22, 1993

[51] Int. Cl.⁵ .............................................. B65G 47/46
[52] U.S. Cl. ................................... 198/365; 198/703
[58] Field of Search ............... 198/357, 358, 365, 366, 198/370, 703, 502.2

[56] References Cited

U.S. PATENT DOCUMENTS

| | | | |
|---|---|---|---|
| 3,055,486 | 9/1962 | Meyer | 198/706 |
| 3,064,357 | 11/1962 | Butters | 198/502.2 X |
| 3,223,964 | 12/1965 | Stadlin | 198/502.2 X |
| 3,357,539 | 12/1967 | Naslund | 198/706 X |
| 4,892,179 | 1/1990 | Lassiter, Jr. et al. | 198/365 |

*Primary Examiner*—D. Glenn Dayoan
*Attorney, Agent, or Firm*—Douglas W. Rudy; Richard B. Megley

[57] ABSTRACT

A bulk material handling conveyor system having a set of buckets carried in a continuous manner from an infeed zone where the buckets are filled with product by way of a metering vibratory feeder to an unloading zone and back to the infeed zone. The buckets may be selectively at least partially emptied in the unloading zone. The conveyor system also includes a proximity trigger for sensing the bucket at the infeed zone adjacent the metering vibratory feeder, a processing unit electrically connected to the proximity trigger for receiving and storing the output of the proximity trigger, a fill determining sensor mounted proximate the buckets between the infeed and unloading zones, the fill determining sensor being connected to the processing unit so that the processor receives and stores the fill status of the buckets upstream of the infeed zone, and a feeder control for cycling the metering vibratory feeder on and off responsive to signals from the processor, the processor signaling the feeder control to cycle on when a bucket is sensed by the fill determining sensor to be less than full.

5 Claims, 3 Drawing Sheets

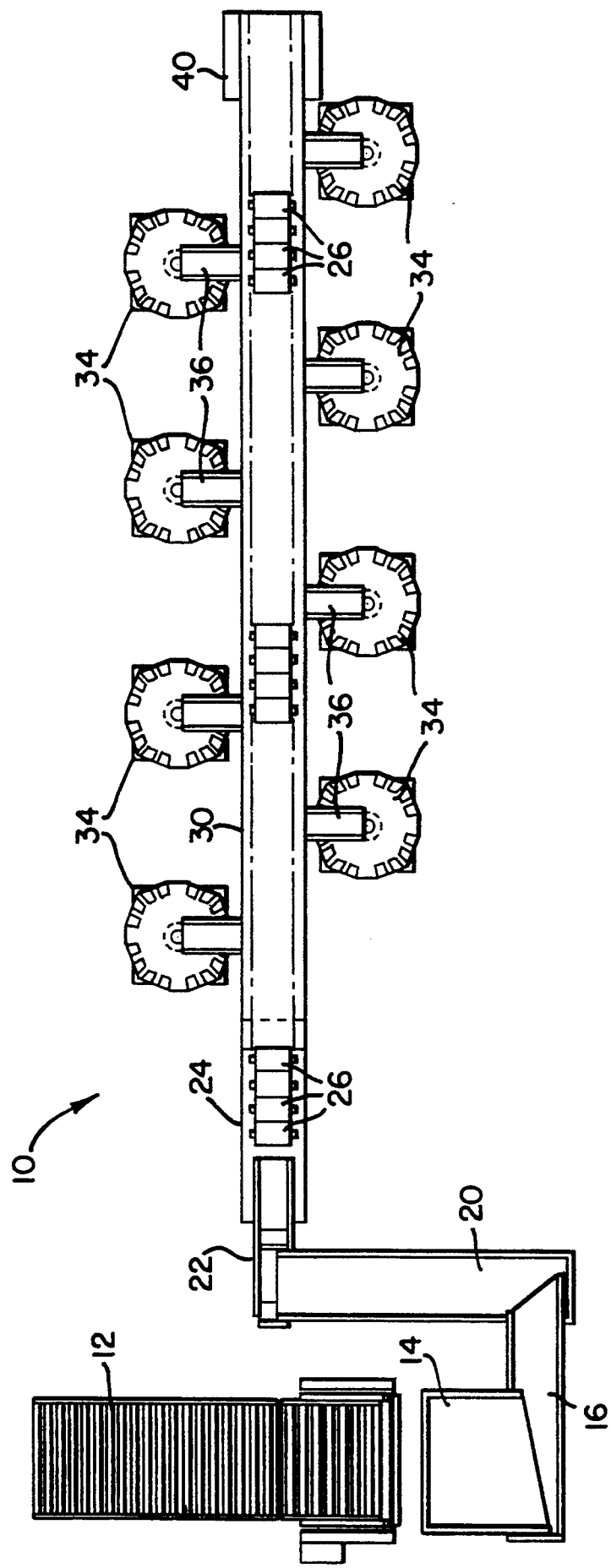

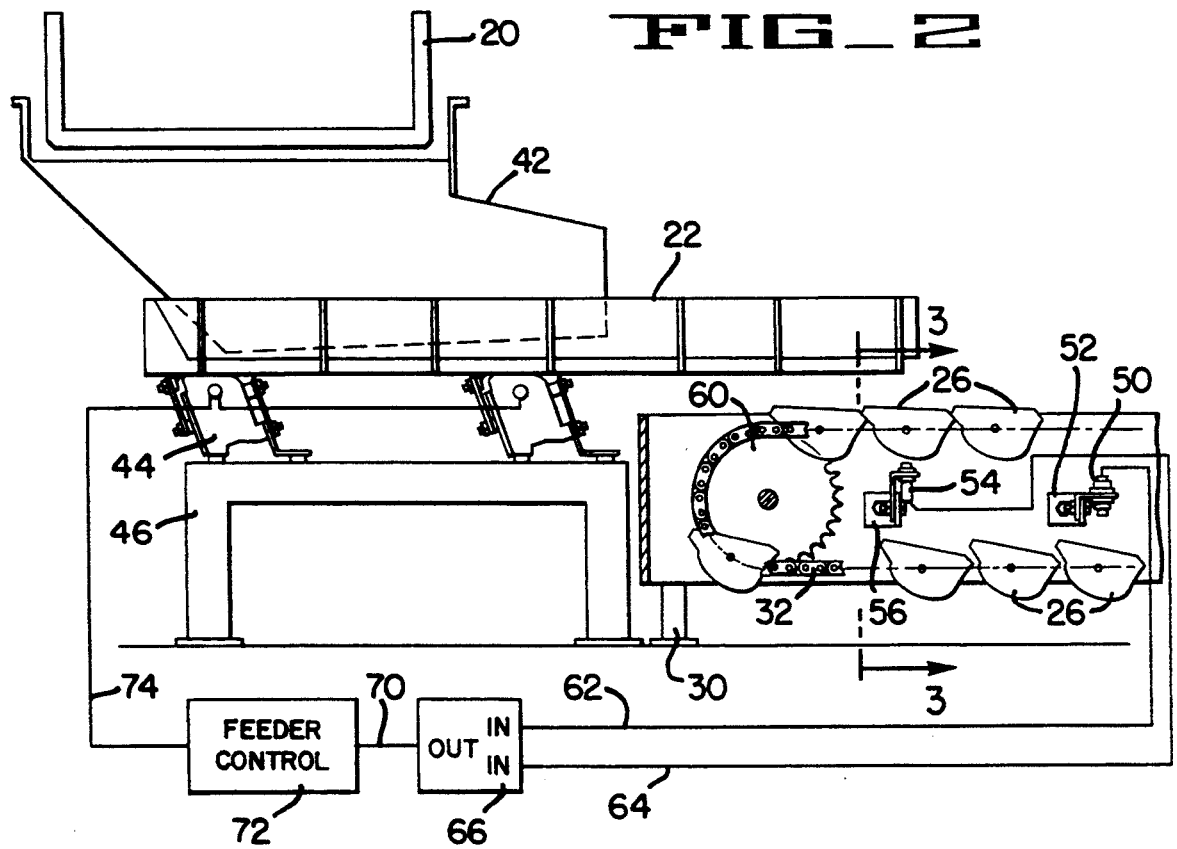
FIG_2
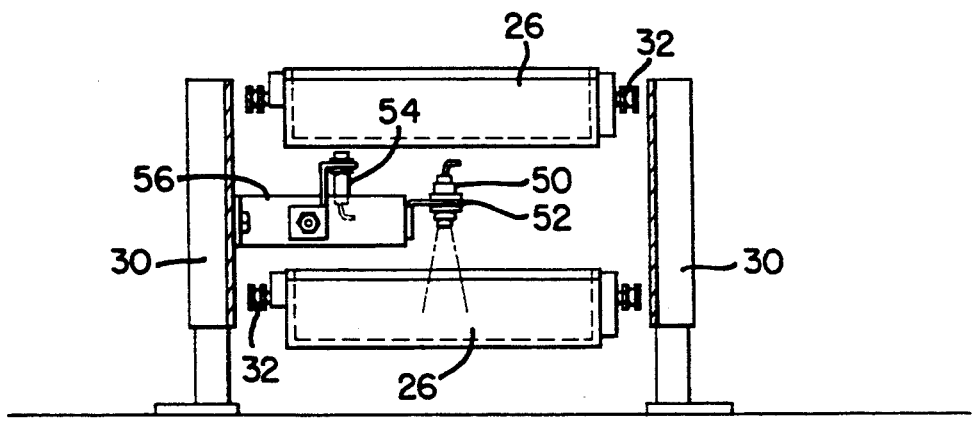
FIG_3

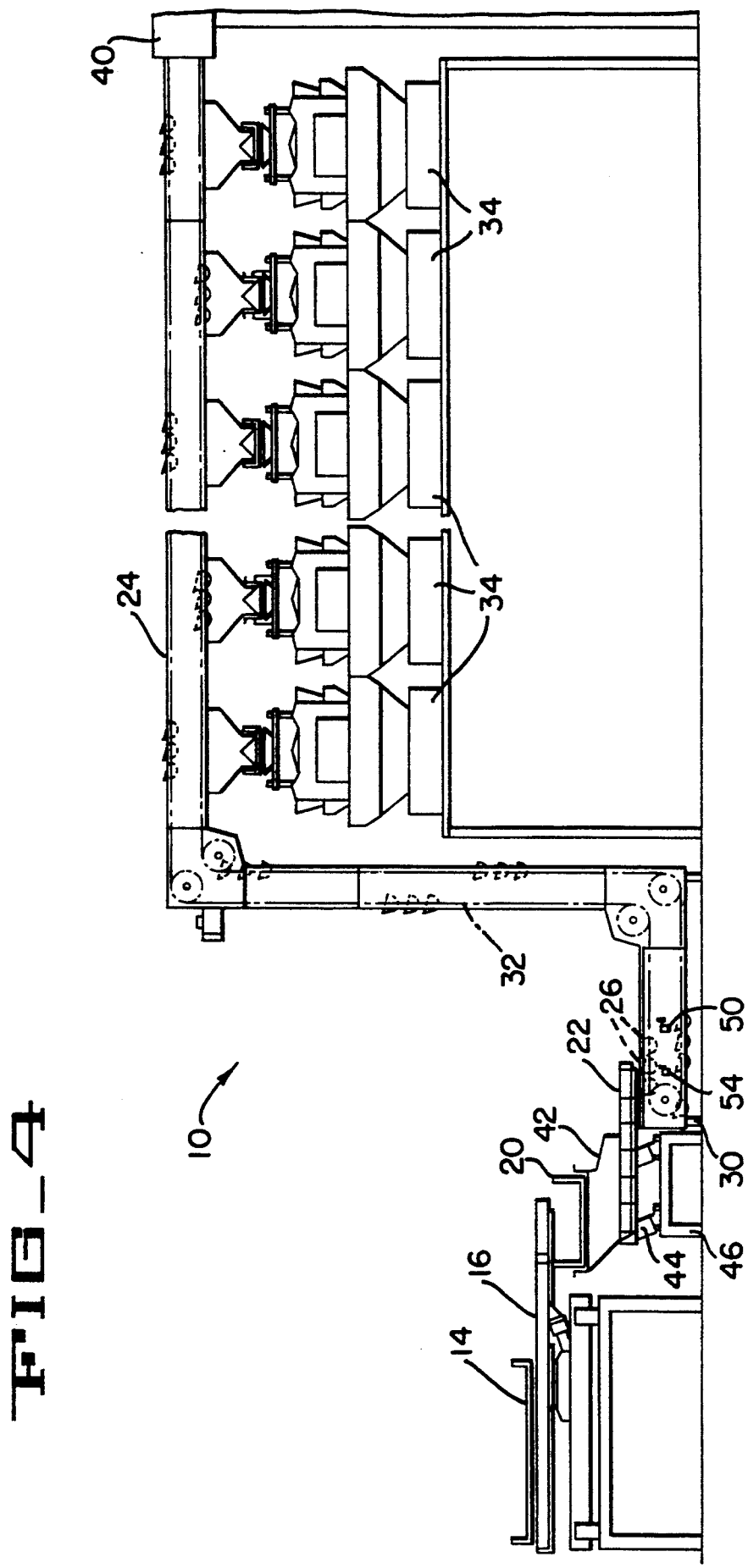

BUCKET LIFT DISTRIBUTION SYSTEM

This invention has to do with distribution systems for distributing bulk flowable materials by means of a bucket style conveying system. More specifically a means for determining the quantity of material in a bucket is incorporated in a control system which will direct a controlled vibratory feeder to fill a particular bucket with an amount of bulk flowable material necessary to fill or otherwise load a bucket with a quantity of material.

It is known to have bucket conveying systems that are used to transport flowable bulk materials. Buckets are filled at a filling or loading station and then unloaded at a packaging or processing station. Systems are also known wherein buckets can be circulated through the system and returned to the filling station without having been dumped. In such situations it is necessary to move the bucket through the filling station without the bucket being overfilled by filling with more than the quantity necessary to fill the empty, partially full or fully filled bucket.

According to the present invention a bucket conveyor distribution system, primarily for use in food packaging processes, includes control elements in the infeed zone that will determine the fill level of individual buckets as they approach the in-feed station and regulate the amount of product being fed into a particular bucket depending on and responsive to packaging system demands of a downstream processing station.

The system is self-regulating based on volumetric demands responsive to packaging station's processing and consumption of product served to the packaging stations by the bucket conveyor system.

One advantage of the system is that an operator is not required to adjust the in-feed volume being loaded into the conveyor buckets. The status; empty, full, or partially full; of each bucket is sensed dynamically and the response of the in-feed filling apparatus is generated without operator adjustment.

Another advantage of the invention is that varying discharge demands, each with varying volume demands, may be accommodated by the system with no in-feed calibration required by operating personnel.

Another advantage of the system is that overfilling, spillage or underfilling of the system is eliminated as adjustments to the fill status of the buckets is continuous and automatic.

In one embodiment of the invention a bucket conveyor system serves product to a series of packaging stations. The product could be a cereal product and the packaging stations could be putting the cereal in lined cardboard boxes at packaging stations. Each packaging station may include a bulk product storage bin that is drawn down as boxes are filled with cereal. The bulk material bucket conveyor will be directed to dump full buckets of material into the storage bin responsive to a signal indicating that the storage bin is running low of cereal. Assuming a bucket is emptied at a storage bin the empty bucket will then be carried to a bucket filling zone for refilling. At this stage the invention will come into play. A first sensing unit, mounted proximate the stream of buckets entering the bucket filling zone will sense the fill condition status of each individual bucket. The fill condition status can range from empty to full. The fill condition status sensed by the sensing unit will be quantified and that quantity stored in the memory of a central processing unit related to the system. The now inventoried bucket will continue through the fill station until it is proximate a bulk material feeder that, in this example, will be actuated for a sufficient time to fill the inventoried bucket.

The central processing unit is programmed to know the travel interval from the sensing unit to the bulk material feeder. With this information and the fill condition status the central processing unit has enough information to determine a quantity of cereal to be loaded into the sensed bucket and when the bucket is proximate the feeder. The central processing unit will then initiate feeder operation for a duration sufficient to fill the sensed bucket as necessary.

It is expected that some full buckets will be cycled back to the feeder zone, these, of course, will not be filled. Partially full buckets will be only provided with enough material to fill them and so on.

Various other objects and features of the invention will become apparent from consideration of the following description and perusal of the accompanying drawing figures.

In the drawing figures:

FIG. 1 is an overhead view of a bucket conveyor system set up to serve eight packaging stations;

FIG. 2 is a side elevation view, with some portions broken away, of the infeed zone of a bucket conveyor system;

FIG. 3 is an elevation view taken through plane 3—3 of FIG. 2;

FIG. 4 is a side elevation view of the bucket conveyor system of FIG. 1 truncated in length for purposes of clarity.

Looking at the plan view of FIG. 1 the product delivery system generally 10 includes an infeed conveyor 12 which is the source of the bulk material that will be distributed in various ways by the bucket conveyor system. A vibratory feeder 14 is one of three vibratory feeders, namely 14, 16 and 20, that are shown in FIG. 1. The number and arrangement of these feeders is not critical to the invention as would be intuitive to a person having skill in layouts of bulk handling systems. These conveyors must only assure that the metering vibratory feeder 22 is supplied with product at all times.

The metering vibratory feeder 22, best seen in FIG. 2, is a conventional vibratory feeder that comprises a trough component and a drive component. The drive component and thus the metering vibratory feeder 22 is cycled on and off by a controller as described further on. The metering vibratory conveyor 22 is proximate to, in this case it has its discharge end located above the path of buckets 26 of the bucket type transporting conveyor 24. Both the buckets and the transporting conveyor are known in the industry although the overlapping arrangement of buckets is unusual.

The bucket transporting conveyor 24 will convey the steam of buckets to the weigh scale fillers such as 34. Eight weigh scale fillers are shown in FIG. 1 as an example. They represent stations where the buckets may be dumped or unloaded but are not meant to limit the invention to a bucket conveyor system solely for use with weight scale fillers. The short term destination of product carried in the buckets is not of concern to the operation of this invention.

In any event, the buckets 26, which are attached to a chain 32 mutually supported by a supporting frame 30, will travel proximate to the weight scale fillers 34 such that the buckets pass over infeed conveyors 36 to the weight scale fillers. These in-feed conveyors can be chutes, slides, driven belts, vibratory feeders, or the like which simply receive the bulk material dumped out of a particular bucket and direct the bulk material to the weigh scale filler.

The conventional turning end 40 of bucket conveyor system directs empty, full or partially empty buckets back to the bucket filling zone, the metering vibratory feeder and the sensors central to this invention.

The sensors and the metering apparatus of the invention are clearly shown in FIGS. 2 and 3. In these figures the third vibratory feeder 20 is positioned to feed the metering vibratory feeder 22 through chute 42. The metering vibratory feeder 22 is driven by vibratory drive motors such as 44 working together when energized to vibrate the trough of the feeder in a well known way when the feeder is signaled to feed product into the buckets 26 below the feeding end of the feeder.

Attached to the supporting frame 30, which supports the chain 32 to which the buckets 26 are attached as well as other drive and structured elements such as bucket unloading cam actuated and rail guide displacement elements is a support 52 for the fill determining sensor 50 and a second support, the support 56 for the proximity trigger 56 which senses when a bucket is below the feeding end of the metering vibratory feeder.

The fill determining sensor 50, which may be an Electro Product ultrasonic sensor, type PCUA, communicates with a central processing unit 66, herein an Allen-Bradley programmable logic controller, by means of conduit 62. Conduit 64 provides an input signal path from the proximity sensor 54 to the PLC or CPU 66.

The processor 66 performs several functions including directing the feeder controller 72, by means of conduit 70 to actuate the drives 44 for a specific time duration as necessary to fill a bucket determined to be in a fillable position below the end of the metering vibratory feeder 22.

The processor has several other functions as well. It will receive a signal from the proximity detector 54 when the proximity detector is switched responsive to the presence of a bucket such as 26. In a preferred embodiment there is equal spacing between all buckets in the bucket conveyor system and it is preferable to have the buckets close to each other as shown in the figures. The number of buckets shown is exemplary. Many buckets have been left off the drawing for reasons of clarity, however, a person familiar with this art will know that a continuous "train" of buckets—with no significant spaces between the buckets—is normal to a bucket conveyor. That is not to say that anything other than evenly spaced buckets is necessary. The processing unit could be programmed to recognize bucket configurations, counts and spacing that is not one-for-one, one-of-two, or the like; however, the preferred embodiment is to have a continuous train of closely positioned buckets on the chain 32.

At this point the processor knows that there is a bucket under the feed end of the metering vibratory feeder 22. That will, and in a preferred embodiment does, trigger the processor to trigger the fill detecting sensor 50. The now actuated fill detecting sensor 50 will sense the amount of product in the bucket proximate to the fill detecting sensor 50. This data will be stored in the processor and held until the sensed bucket moves to the position below the end of the metering vibrating feeder. When the bucket gets to that point the processor will signal the feeder controller 72 to turn on the metering vibratory feeder 22 for a duration computed by the processor sufficient to fill the bucket. The bucket will be filled and the metering vibratory feeder will be shut off by the feeder controller upon receiving a signal from the processor that the duration of metering vibratory feeder has been sufficient to fill the bucket.

In a preferred embodiment the proximity trigger 54 is placed as shown in FIG. 2, that is below the bucket 26 under the metered vibratory feeder 22 lip, however, this location is not critical. It is possible to place the proximity trigger 54 at other locations in the system since the processor simply needs a signal telling it when a bucket is in position to be loaded and as long as the bucket spacing is known and consistent the presence of a bucket sensed in any location will logically mean that there is a bucket below the lip of the metered vibratory feeder allowing, of course, for recision and precision due to drive speed variation, load in the system and wear. For instance, it may be desirable to have the proximity trigger 54 sensing the presence of the same bucket that is being scanned by the fill detecting sensor 50.

It should be pointed out that the full buckets leaving the in-feed zone will travel to the weigh scale fillers 34 and each weigh scale filler will be monitored to maintain a desired level of bulk product in the filler bin. As the bulk material is drawn out of the filler bin and deposited into boxes, for instance, the weigh scale filler will signal an unloading feature at the filler that will cause a full bucket to dump its load of bulk material onto the infeed conveyor 36 to the weigh scale filler, that empty bucket will be refilled on its next pass through the in-feed zone. It is very likely that a full bucket will travel past all the weigh scale fillers without being dumped. In a preferred embodiment this full bucket will pass through the infeed zone full and "make another round". It is possible to dump the full bucket before it reaches the in-feed zone and present a possibly empty bucket to the fill detecting sensor.

it is believed that a control system for sensing bucket fill status of buckets in a bucket conveyor and responding to that sensed status by filling the buckets appropriately has been set forth in this specification. Nuances of design that don't depart from the broad scope of this disclosure are contemplated by the following claims.

What is claimed is:

1. In a bulk material handling conveyor system having a set of buckets transportably carried in a continuous manner from an infeed zone where said buckets are filled with product by means of a metering vibratory feeder having a product outlet to an unloading zone and back to the infeed zone, said buckets capable of being selectively at least partially emptied in said unloading zone; the improvement comprising:

a proximity trigger for sensing the presence of a bucket;

a processing unit electrically connected to said proximity trigger for receiving and storing the output of said proximity trigger;

a fill determining sensor mounted proximate to said buckets between said unloading zone and said metering vibratory feeder, said fill determining sensor electrically connected to said processing unit whereby said processor receives and stores the fill status of said buckets prior to said buckets traveling in said conveyor system to said metering vibratory conveyor;

a feeder control electrically connected to said processor for cycling said metering vibratory feeder on and off responsive to signals from said processor, said processor signaling said feeder control to cycle on when a bucket of said set of buckets having been sensed by said fill determining sensor to be less than full is proximate the outlet of said metering vibratory feeder.

2. The invention in accordance with claim 1 wherein said proximity trigger is mounted proximate a bucket location at the product outlet of said metering vibratory feeder.

3. The invention in accordance with claim 2 wherein said fill determining sensor is capable of discriminating between an empty bucket and a full bucket and any fill status between these two conditions.

4. In a bucket conveyor system including a set of buckets transportably carried in a continuous manner from an infeed zone where said buckets may be filled with product by means of a metering vibratory feeder to an unloading zone where said buckets may be unloaded and back to the infeed zone, a proximity trigger mounted proximate to said set of buckets, a fill determining sensor mounted proximate to said set of buckets for sensing the amount of product in each of said buckets of said set and sensing the amount of product in each of said buckets of said set and a processor for receiving signals from said proximity trigger and said fill determining sensor, a method of determining the fill status of each bucket and filling each bucket responsive to the fill status comprising the steps of:

determining the presence of a bucket at a particular location in the belt conveyor system by means of said proximity trigger;

storing the occurence of the presence of a bucket determined by said proximity trigger in said processing unit;

determining the fill status of a bucket at the time said proximity trigger is triggered by the presence of a bucket;

actuating said metering vibratory feeder by means of said processor sending a signal to a feeder control for controlling said metering vibratory feeder at the time when said proximity trigger is triggered by the presence of a bucket in order to fill a bucket previously determined to be less than full.

5. The invention in accordance with claim 4 wherein said processor stores the fill status data until such time as said bucket having that particular fill status is proximate the outlet of said metering vibratory feeder.

\* \* \* \* \*